May 16, 1939.  F. W. DOUTHITT  2,158,977
MACHINE FOR PREPARING CORN FOR CANNING ON THE COB
Filed Nov. 30, 1936  10 Sheets-Sheet 2

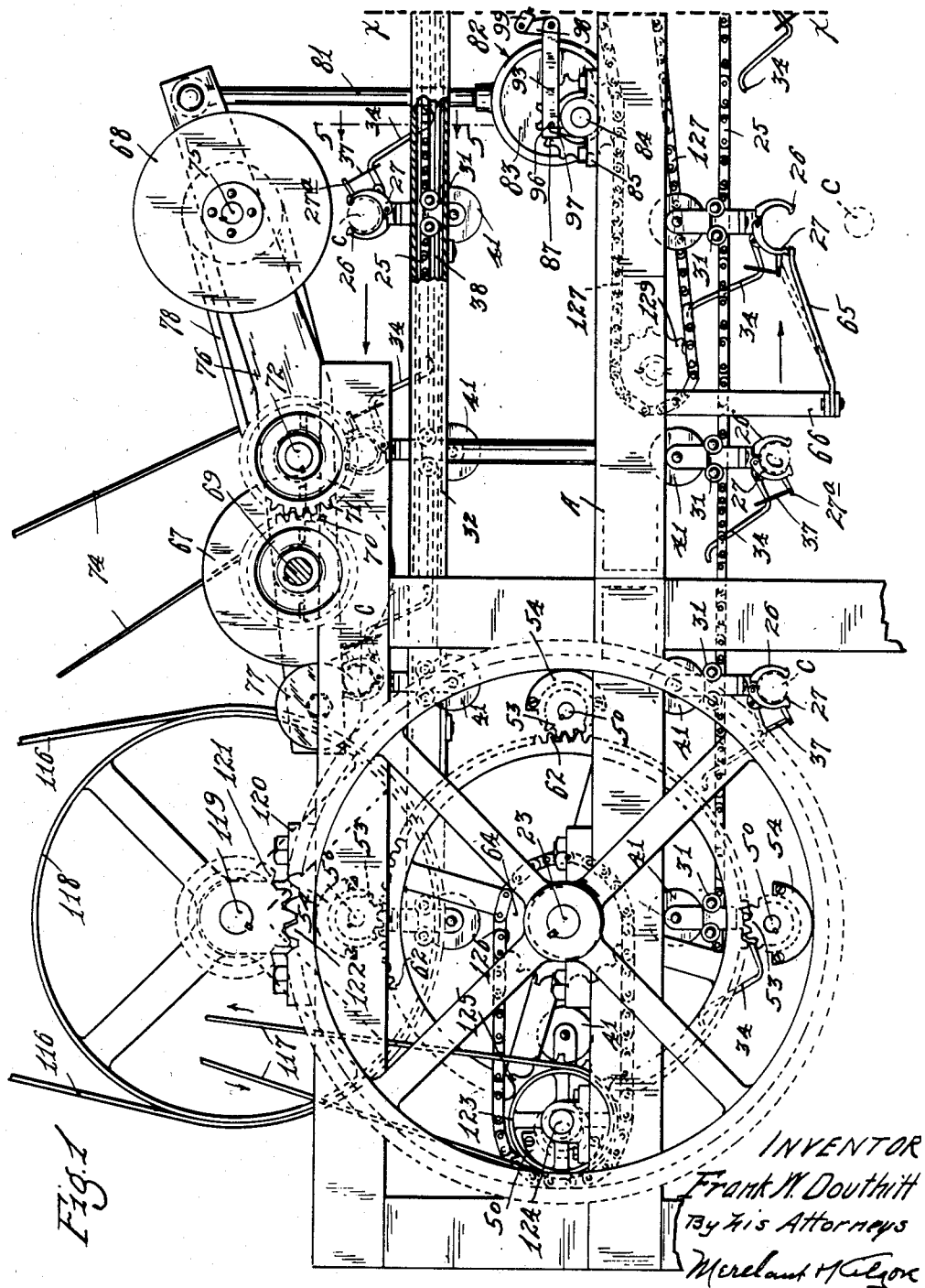

INVENTOR
Frank W. Douthitt
By his Attorneys
Merchant & Gilmore

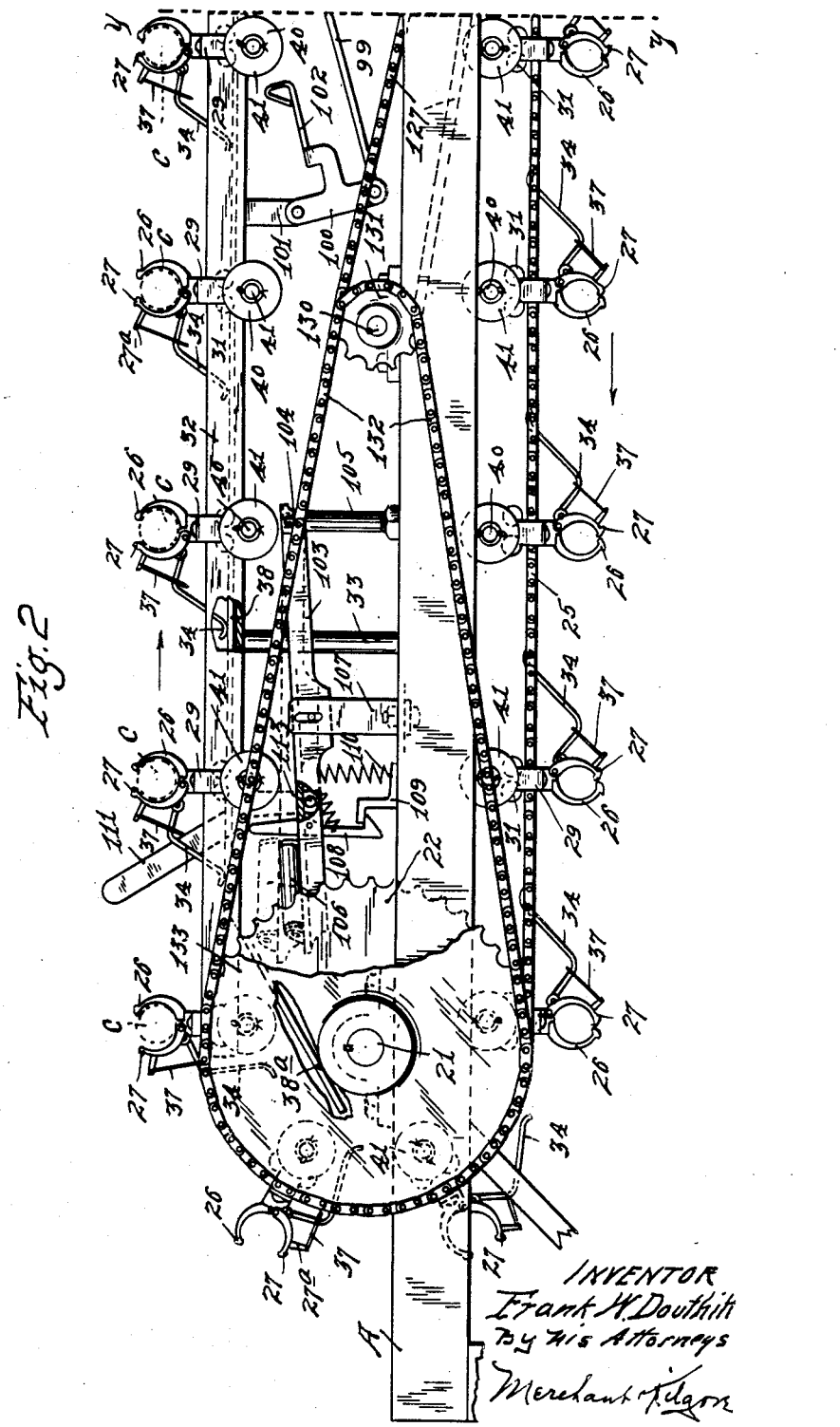

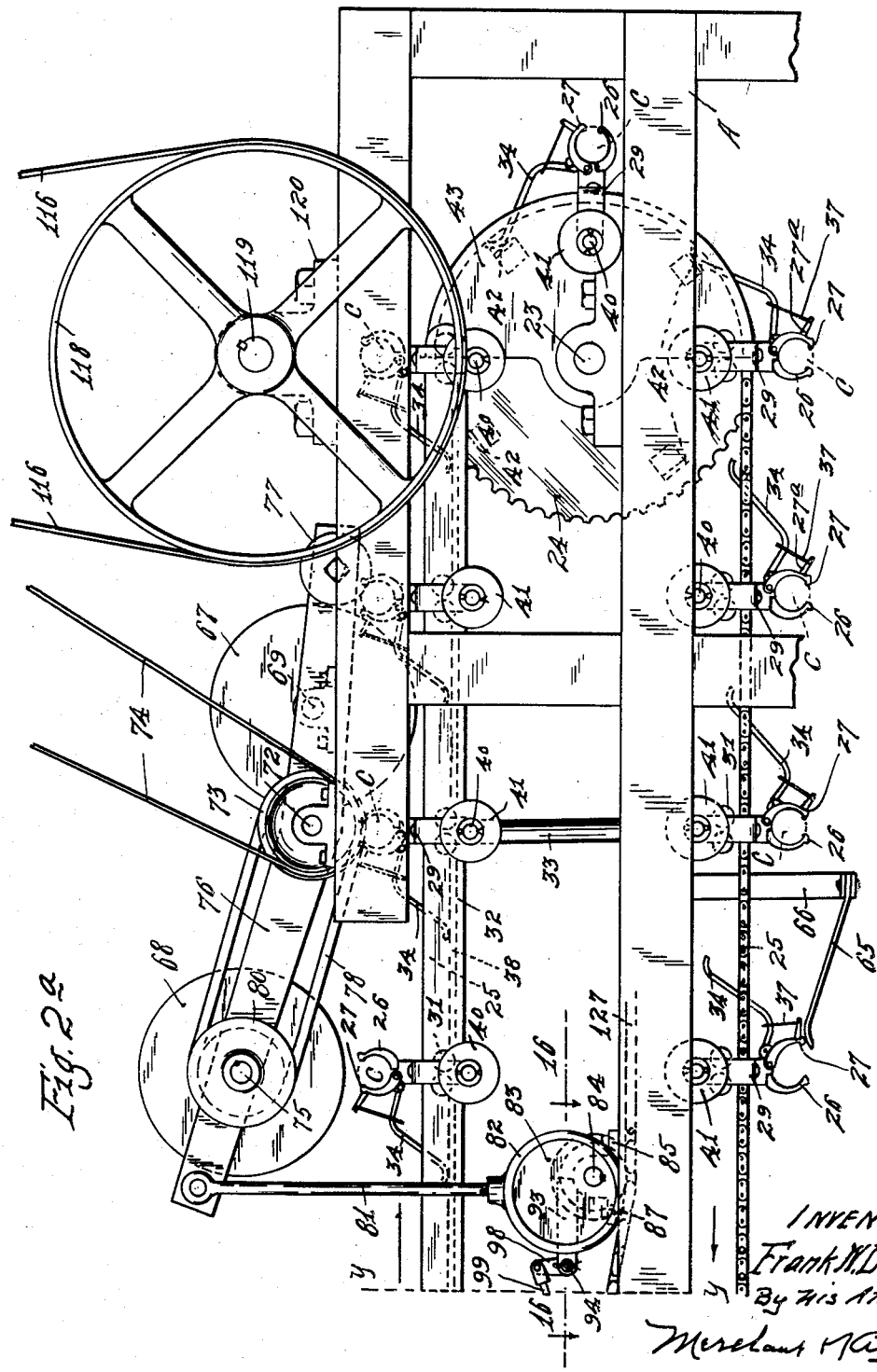

May 16, 1939.  F. W. DOUTHITT  2,158,977
MACHINE FOR PREPARING CORN FOR CANNING ON THE COB
Filed Nov. 30, 1936  10 Sheets-Sheet 5
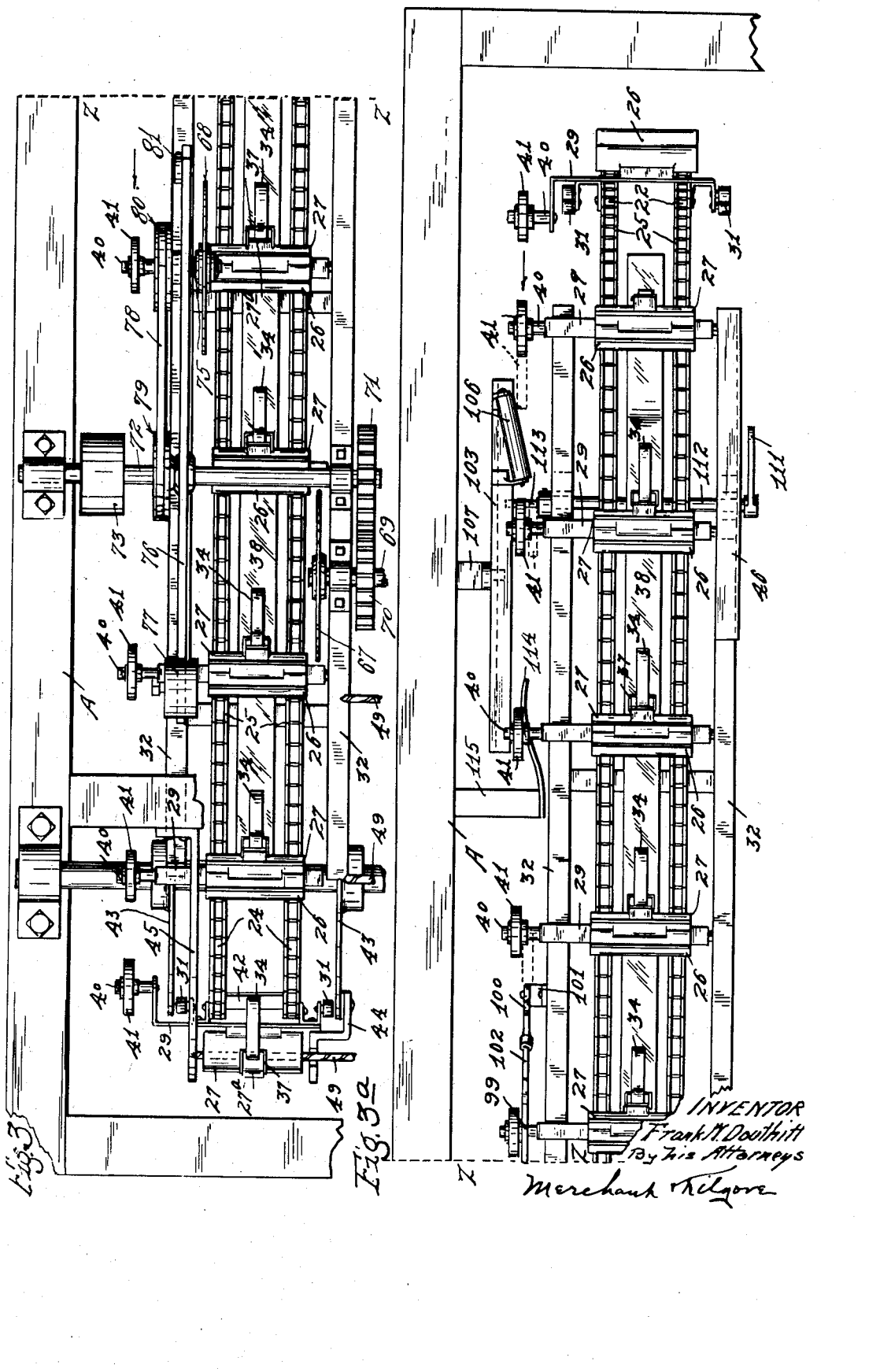

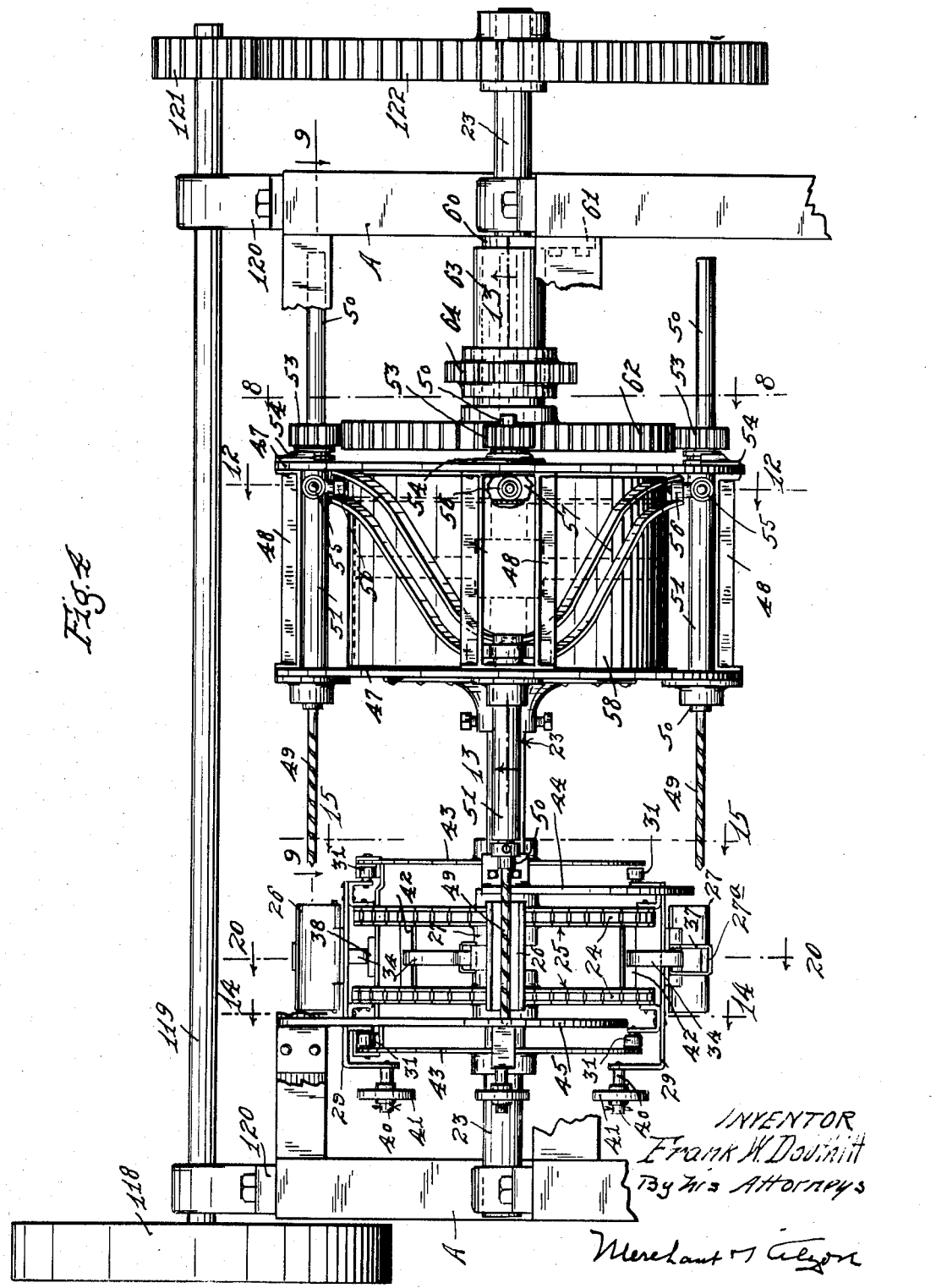

May 16, 1939.  F. W. DOUTHITT  2,158,977
MACHINE FOR PREPARING CORN FOR CANNING ON THE COB
Filed Nov. 30, 1936  10 Sheets-Sheet 7
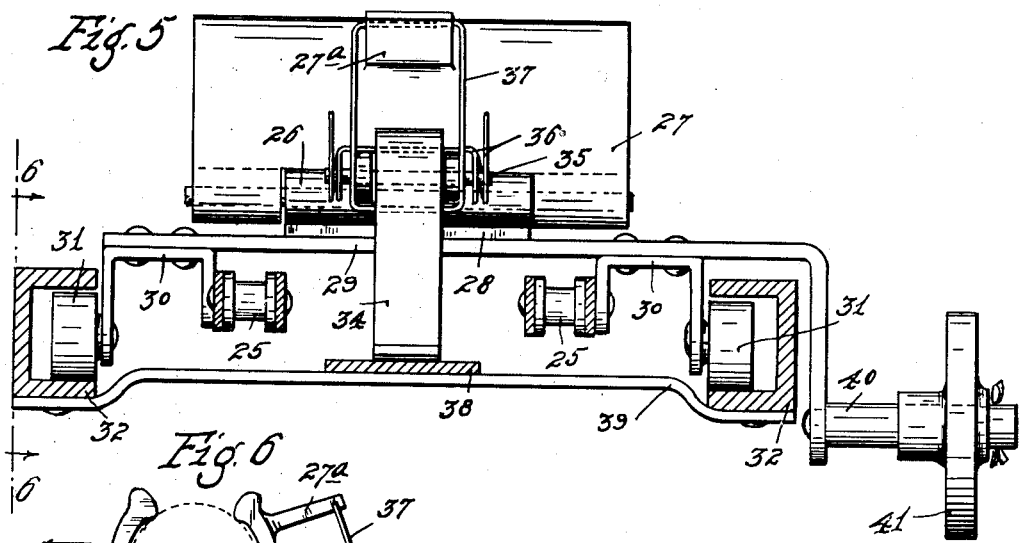
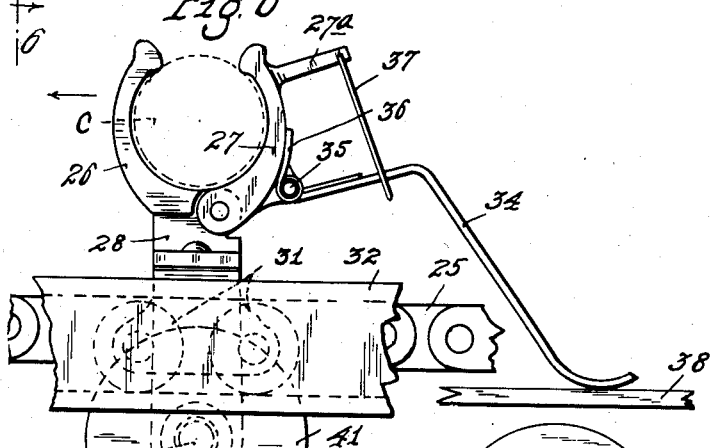
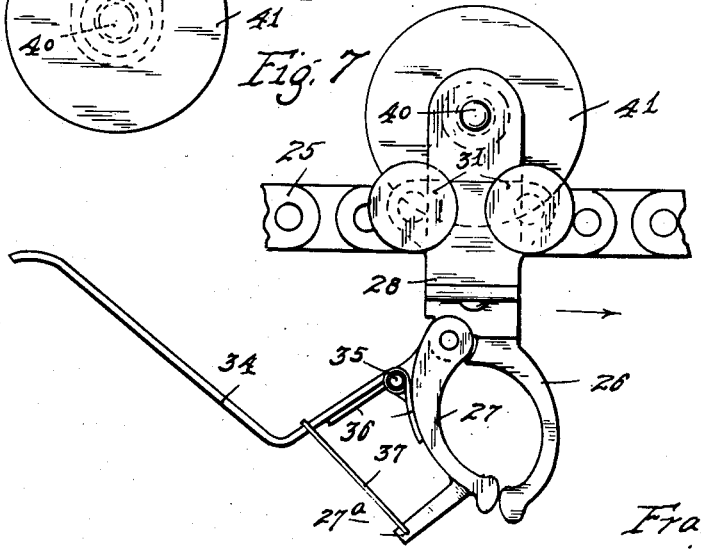
INVENTOR
Frank W. Douthitt
By his Attorneys
Merchant Kilgore May 16, 1939.   F. W. DOUTHITT   2,158,977
MACHINE FOR PREPARING CORN FOR CANNING ON THE COB
Filed Nov. 30, 1936   10 Sheets-Sheet 8

INVENTOR
Frank W. Douthitt
By his Attorneys
Merchant & Gregor

May 16, 1939.  F. W. DOUTHITT  2,158,977
MACHINE FOR PREPARING CORN FOR CANNING ON THE COB
Filed Nov. 30, 1936   10 Sheets-Sheet 9
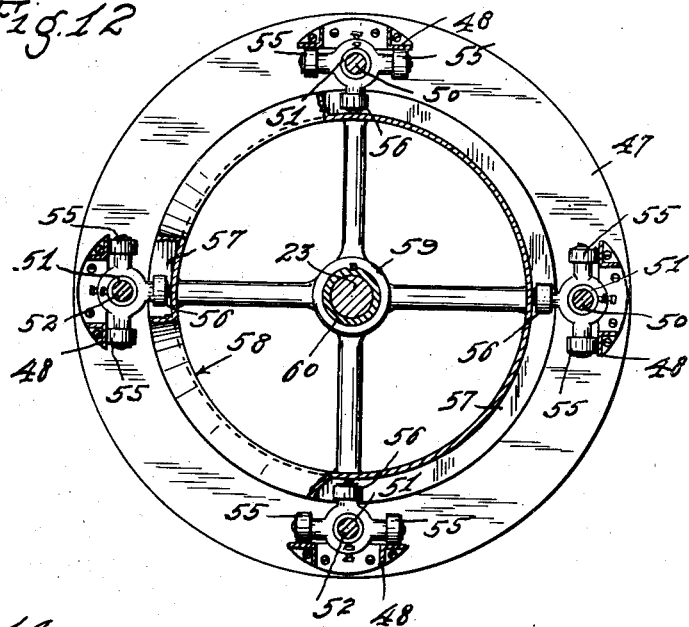
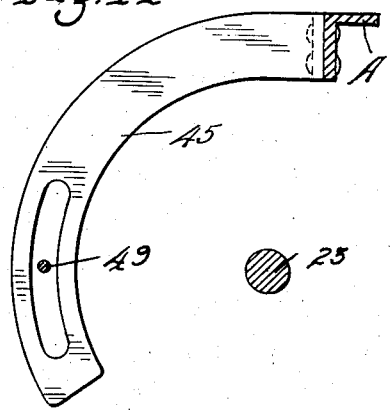
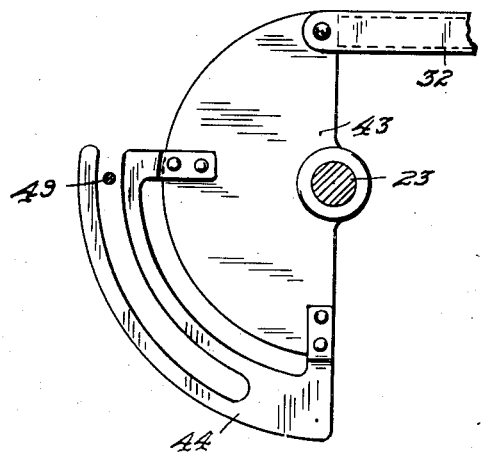
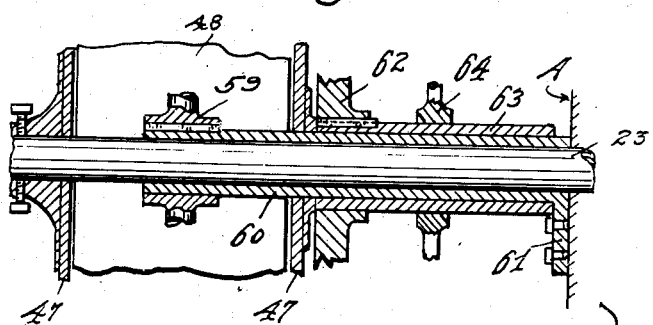
INVENTOR
Frank W. Douthitt
By his Attorneys

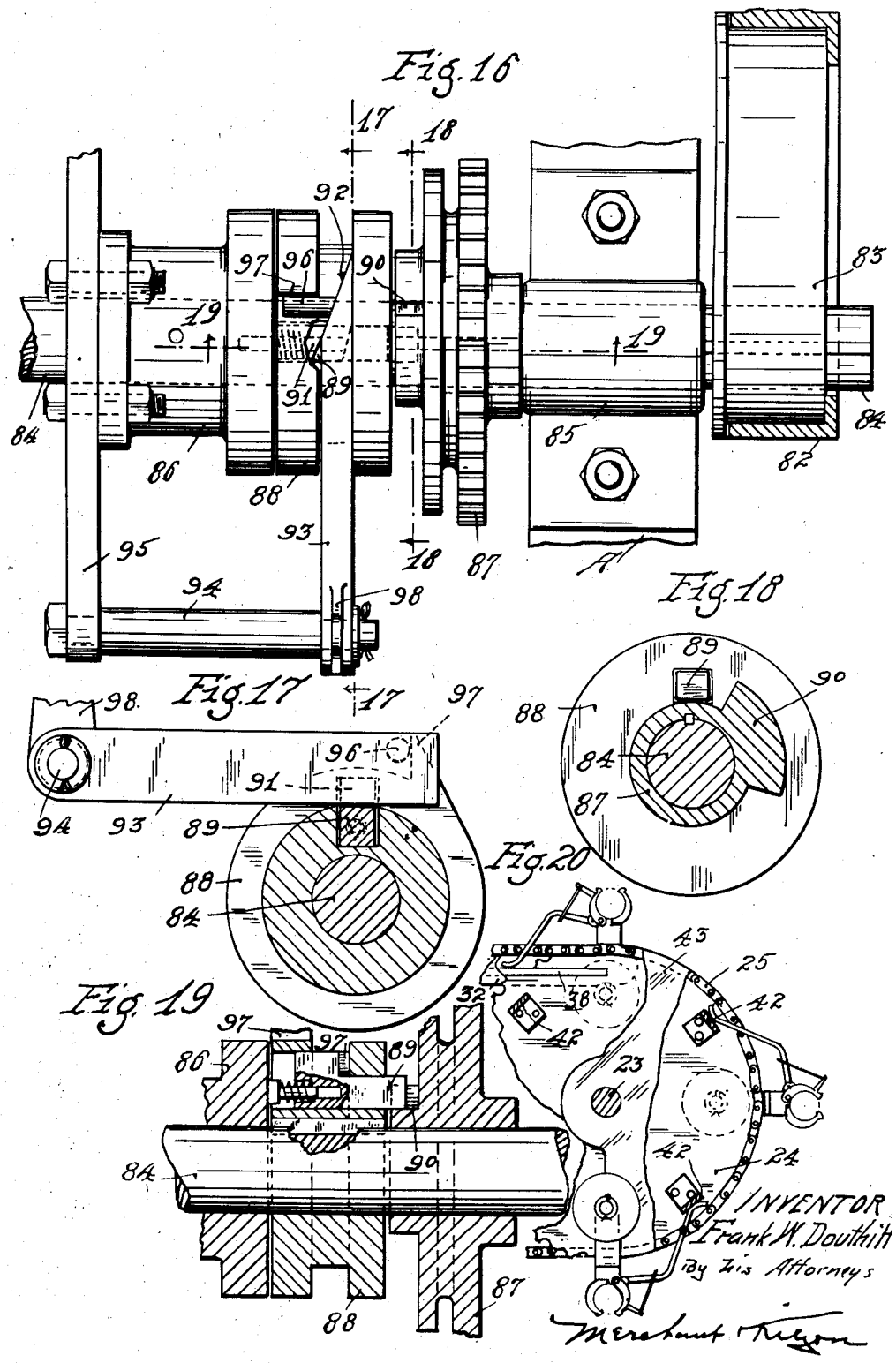

Patented May 16, 1939

2,158,977

UNITED STATES PATENT OFFICE 2,158,977

MACHINE FOR PREPARING CORN FOR CANNING ON THE COB

Frank W. Douthitt, Ortonville, Minn., assignor to Edwin C. Kraus, Le Center, Minn.

Application November 30, 1936, Serial No. 113,397

12 Claims. (Cl. 146—84)

My present invention provides an improved machine for preparing corn for canning on the cob and, generally stated consists of the novel device, combinations of devices, and arrangement of parts hereinafter described and defined in the claims.

In preparing the corn ears for canning on the cob it is important that the ears be trimmed at one or more ends so that the ears will be of uniform length, and to trim off defective portions of the ears. Moreover, I have found that it is highly desirable to remove much or all of the core of the cob so that the cob will be hollow. The cob thus bored or hollowed out not only will reduce the weight of the ear, but gives the preserving fluid a chance to act from the center of the cob outward and removes portions of the cob which, if left in the cob, detrimentally affect the flavor of the corn.

The improved machine involves various novel features and combinations of devices whereby the functions above stated and other important functions are accomplished. In the commercial form of this improved machine, illustrated in the drawings and hereinafter fully described, the corn ears are manually or otherwise placed in grapples of an endless belt or conveyor, are carried past trimming machines, and from thence, are carried up to boring devices or drills which perform the operation of boring out the core of the cobs.

In the accompanying drawings, which illustrate the commercial machine, like characters indicate like parts throughout the several views.

Referring to the drawings:

Figs. 1 and 1a are complemental elevations showing the improved machine in left side elevation, directions being taken in respect to an observer standing at the receiving end of the machine, the said views, to make the complete machine, requiring to be put together on the dotted lines marked x—x on said views;

Figs. 2 and 2a are complemental views in elevation looking at the machine from the right-hand side, said views requiring to be put together on the dotted lines marked y—y on said views;

Figs. 3 and 3a are complemental views showing the improved machine in plan, said views requiring to be put together on the dotted lines marked z—z on said views;

Fig. 4 shows the improved machine looking at the same from the delivery end of the machine or in a direction from left toward the right in respect to Fig. 1, with some parts being broken away;

Fig. 5 is a detail in transverse section taken on the line 5—5 of Fig. 1;

Fig. 6 is a view in side elevation showing parts just at the right of the line marked 6—6 on Fig. 5;

Fig. 7 is a detail in side elevation showing one of the inverted grapples and a portion of the endless chain belt that carries the same;

Fig. 13 is a fragmentary view with parts broken away but with some parts sectioned on the line 13—13 of Fig. 4;

Fig. 14 is a fragmentary view in section on the line 14—14 of Fig. 4;

Fig. 15 is a section on the line 15—15 of Fig. 4;

Fig. 16 is a view partly in plan but with some parts sectioned on the line 16—16 of Fig. 2a, the said parts being on a larger scale than in Fig. 2a and some parts being broken away;

Fig. 17 is a section on the line 17—17 of Fig. 16;

Fig. 18 is a section on the line 18—18 of Fig. 16;

Fig. 19 is a fragmentary axial section taken on the line 19—19 of Fig. 16; and

Fig. 20 is a fragmentary view showing certain parts in section on the line 20—20 of Fig. 4.

Figure 12:
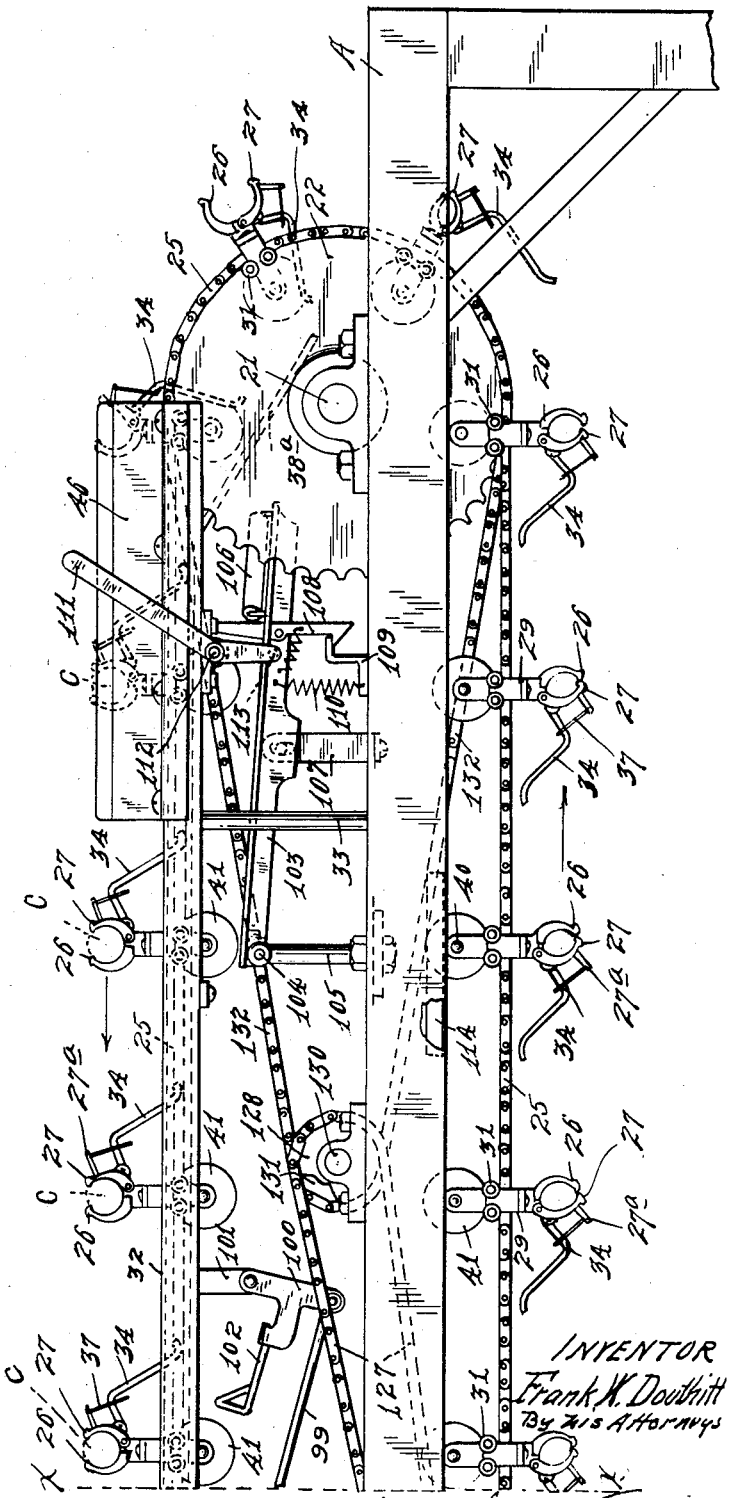
Fig. 12 is a vertical section on the line 12—12 of Fig. 4, some parts being broken away.
Figure 8:
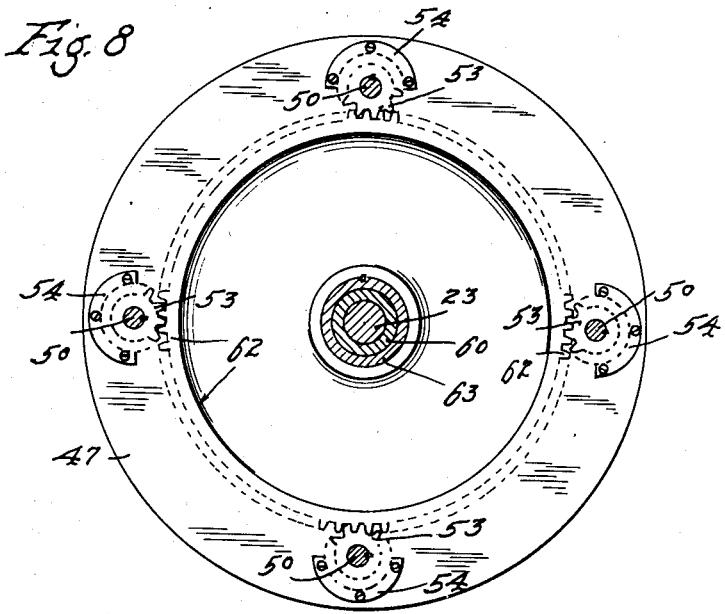
Fig. 8 is a detail in section on the line 8—8 of Fig. 4, the teeth of the gear and pinions being indicated by parts in full and parts in dotted lines.

Attention is first called particularly to Figs. 1–1a, 2–2a, and 3–3a. The various parts of the machine are preferably mounted on a long horizontally-disposed rectangular framework A, preferably of commercial steel. Journaled in suitable bearings at the receiving end of the machine, to wit; the right-hand end as viewed in Figs. 1–1a and 3–3a, and at the left-hand end as viewed in Figs. 2 and 2a is a transverse shaft 21 that carries large laterally-spaced belt-driving sprocket wheels 22; and mounted in suitable bearings on said frame at the delivery end thereof, to wit: the left-hand end as viewed in Figs. 1–1a and 3–3a, and at the right-hand end as viewed in Figs. 2 and 2a is a transverse shaft 23 that carries large laterally-spaced belt-driving sprockets 24.

A carrier belt made up of laterally-spaced sprocket chains or link belts 25 is arranged to run over the aligned sprockets 22 and 24. These link belts carry corn-ear-engaging grapples spaced at suitable intervals thereon. These grapples, see also Figs. 5 and 7, comprise jaws 26 and 27, the former of which are rigidly connected and the latter of which are pivotally connected to blocks 28. The blocks 28 are secured to cross bars 29 in the structure illustrated, which in turn are connected to links of the chains or belts 25 by U-shaped brackets 30. The depending arms of the brackets 30 are equipped with guide rollers 31 that run in channel-shaped guide rails 32 which, in the structure illustrated, are supported above the horizontal bars of the frame A by posts 33. Jaw-closing arms 34 are attached to the pivoted jaws 27 at 35, and springs 36 applied around the pivots 35 and compressed between the arms 34 and jaws 27, tend to press the said arms downward or away from the respective jaws. Movement of the arms 34 away from the jaws 27 is limited by yoke-like links 37 that embrace said arms and are pivotally attached to projections 27a of said jaws. As the grapples move with the upper run of the carrier belt, made up of the sprocket chains 25, the free ends of the arms 34 ride upon a skid or fixed rail 38 that is rigidly supported in respect to rails 32, as shown, by means of cross bars 39, see particularly Fig. 5. At one side the cross bars 29, as shown, are provided with downward ends having projecting studs 40 on which tripping rollers 41 are mounted for rotary and axial sliding movements. The purpose of these tripping rollers or elements 41 will hereinafter appear.

The guide rails 32 extend from a point vertically over the axis of the shaft 21 to a point approximately vertically over the axis of the shaft 23. The grapple-actuating rail 38 also terminates at a point approximately vertically over the shaft 23, but at its other end and above the shaft 21, it is obliquely turned downward, as shown, at 38a (see particularly Figs. 2 and 1a) to form a cam-acting surface for action on the free ends of the grapple arms 34. The sprockets 24 carry rest lugs or bars 42 (see particularly Fig. 20), with which the free ends of the grapple arms 34 engage as they ride off from the rear ends of the rail 38. The rollers 31 move off from the flanges of the rails 32 at points vertically above the axis of the shaft 23. The link belts or sprocket chains leave the lower portions of the sprockets 24, and the grapples make their return movements inverted or upside down, while the grapples with the ears of corn are being carried from the guide rails to the bottoms of the sprockets 24. The boring out of the corn cobs is accomplished by novel means which will presently be described, directing attention particularly to Figs. 4, 12, 13, 14 and 15.

As shown in Fig. 15, the delivery ends of the rails 32 are attached to the upper end of the segmental supporting plate 43 that is hung on the shaft 23 and supports a slotted segmental guide plate 44. This guide plate 44 is spaced from a co-operating slotted segmental guide plate or strip 45, the upper end of which, as shown in Fig. 14, is rigidly secured to one of the cross bars of the frame A. These guide plates 44 and 45 are so spaced that they will hold the cobs carried by the grapples against endwise movements while they are being bored out. The cobs are initially positioned for proper entry between the plates 43 and 45 by a guide or stop plate 46 located at the receiving end of the machine and, as shown, secured to and rising from the receiving end of the left-hand rail 32 (see particularly Figs. 1a and 3a).

Figure 9:
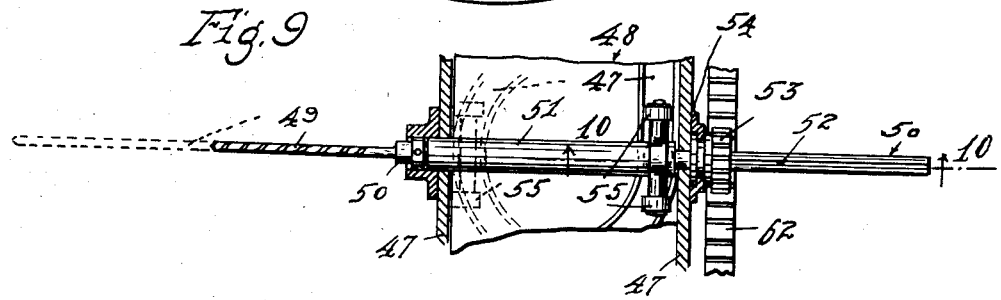
Fig. 9 is a detail in axial section taken on the line 9—9 of Fig. 4.
Figure 10:
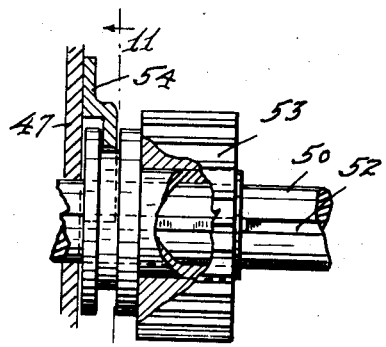
Fig. 10 is a fragmentary view partly in elevation and partly in section on the line 10—10 of Fig. 9.
Figure 11:
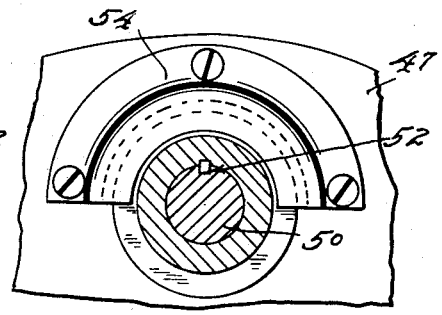
Fig. 11 is a detail in section on the line 11—11 of Fig. 10.

The means for boring out the corn cobs is best illustrated in Figs. 1, 4, and 8 to 11 inclusive. A rotary drill is made up of laterally-spaced disc-like plates 47, the hubs of which are rigidly secured to the shaft 23, and the outer end portions of which are tied together by tie bars 48. This rotary drill carrier carries a plurality of four drills 49 that extend parallel to the axis of the shaft 23 and are spaced circumferentially 90° apart. The drills are detachably connected to the ends of drill-carrying spindles 50 that are rotatably mounted in sleeves 51. These sleeves 51 are mounted for endwise movements with the respective drills and work through the left-hand plate 47, as shown in Fig. 9. The forwardly projecting end of spindle 50 has a long keyway or groove 52. These groove portions of spindle 50 work slidably through pinions 53 that are keyed to rotate said spindles while permitting axial movements of the latter. The hubs of the pinions 53 are mounted for rotary movements but held against axial movements in respect to the right-hand plates 47, by means of keepers 54 having flanges that engage grooves of said pinions (see Figs. 9, 10 and 11). The sleeves 51 are, as best shown in Figs. 9 and 12, each provided with projections equipped with rollers 55—55 and 56. The rollers 55 are arranged to run against the tie bars 48 which, as will be noted, are so spaced as to afford guides for holding the sleeve 51 against rotation on its own axis while it is being moved axially to project or retract the drills.

The rollers 56 work in the cam channel 57 (see particularly Figs. 4 and 12) of a drum-like cam support 58, having arms radiating from a hub 59, that is keyed to its bearing sleeve 60 (see particularly Figs. 12 and 13). This sleeve 60 is extended through and affords a bearing for the hub of one of the plates 47, and at its projecting end has an anchoring flange 61 that is rigidly secured to one of the members of frame A. In this way the cam-equipped drum is held against rotation.

By reference to Fig. 4, it will be noted that the cam-way or groove 57 throughout approximately 180° is in a plane perpendicular to the axis of the shaft 23, but throughout the other 180°, as best shown in Fig. 4, is laterally offset. To be more specific, the cam-way 57 through 90° extends laterally toward the left in respect to Fig. 4, and throughout the other second 90°, it extends laterally toward the right and back to the non-diverging part of said cam-way. It is now also clear that the rollers 56 of the several drill projecting sleeves 51 work in the cam-way or groove 57. The manner in which the drilling operation is performed will be made clear in the description of the operation.

The several drill-driving pinions 53 engage with a large spur gear 62 having a long sleeve 63 journaled on the non-rotary sleeve 60 and provided with a sprocket 64 (see Figs. 4 and 13).

As the grapples make their return movement on the lower portion of the belt and while the grapples are in inverted positions, the movable jaws of the grapples are brought into frictional contact with a tripping or jaw-opening device, preferably the form of a leaf spring or arm 65 (see Fig. 1) that is supported by a bracket 66 rigidly secured to and depending from the main frame A. This grapple opening action drops the ear of corn (indicated in Fig. 1 by dotted lines marked c—c), after the ear has been bored out and subjected to trimming action by means which will now be described.

The ear-trimming action is accomplished by cutters preferably in the form of power-driven rotary discs or fine-tooth saws. Preferably I employ trimming knives or discs, one of which is designated as the primary cutter and is always in position for operation, and the other of which is designated as the secondary cutter as is arranged to be moved to and from operative position, at will, but may be held always in operative position when desired. The primary knife or cutter is indicated at 67 and the secondary knife or cutter at 68. The primary cutter 67 is secured on the shaft 69 (see Figs. 1, 2a and 3), that is journaled in suitable bearings on the main frame and provided with a pinion 70. Pinion 70 meshes with a spur gear 71 on a transverse countershaft 72 that is journaled in suitable bearings on the main frame A. Shaft 72 is provided with a pulley 73 over which runs a power-driven belt 74. Cutter 67 is so located that it will cut off the butt ends of the cobs that have been placed in the grapples with their butt ends against the stop plate 46.

The secondary cutter 68 is located farther toward the delivery end of the machine than the primary cutter 67 and is laterally offset from the cutter 67 a distance represented by the desired length of the corn ear. In its normal arranged position the secondary cutter 68 is inoperative on the corn ear but when moved downward to operative position, it will cut off the tip end of the ear providing the ear is of a greater length than desired for canning.

Means illustrated for moving the secondary knife 68 into and out of action comprises the following elements:

The secondary knife or cutter 68 is secured to a short shaft 75 that is journaled in the extended end of a supporting oscillatory arm 76 that is intermediately pivoted on the shaft 72 and has a counter-weighted end 77. Knife 68 is power-driven through a belt 78 that runs over a pulley 79 on the shaft 72 and over a pulley 80 on the shaft 75.

The extended end of supporting arm or lever 76 is connected by a rod 81 to an eccentric strap 82 that works on an eccentric or crank 83. The shaft 83 (see particularly Figs. 1 and 16 to 19 inclusive), is secured on a shaft 84 journaled in bearings 85 and 86 on the main frame A. Rotatively mounted on shaft 84 is a sprocket 87 constantly driven, hereinafter to be described. The key to the shaft 84 between the hub of sprocket 87 and the non-rotary hub or sleeve 86 is a clutch sleeve 88. For sliding movements transversely through the clutch sleeve 88 is a spring-pressed clutch dog 89, the projecting end of which is engageable with a clutch lug 90. The dog 89 has an outwardly extended bevel shoulder 91 (see particularly Fig. 19). The bevel shoulder 91 is adapted to be engaged with the bevel end 92 of a clutch-tripping lever 93, the extended end of which, as shown, is pivoted to a stud 94 projected from an arm 95, rigidly secured to the non-rotary hub or sleeve 86 and to a fixed part of the frame A. At its free end clutch-tripping lever 93 has a projecting stop in the form of a pin 96 (see particularly Fig. 16), that is engageable with a projecting stop lug 97 (see particularly Fig. 14), on the clutch hub 88. The mechanism just described and best illustrated in Figs. 16 to 19 constitutes a one-revolution clutch for connecting the eccentric 83 and its shaft 84 to the constantly-driven sprocket 87.

The clutch-tripping lever 93 at its pivoted end has an upstanding lug 98 which, by a link 99 (see Figs. 1a, 2 and 2a), is connected to a belt crank lever 100, which in turn is pivoted to a bracket 101 secured on one of the rails 32. Lever 100 has a projecting arm 102 the free end of which is adapted to be engaged and depressed by the rollers 41 which, it will be remembered, are slidably mounted on studs 40, carried by cross bars 29, which in turn are connected to and carried by the link belts or sprocket chains 25. Normally, however, the rollers 41 are slid outward and are carried at the outer ends of the studs 40 (as shown in Fig. 5), so that they will clear the free end of arm 102.

Means is provided for sliding the rollers 41 toward the left in respect to Fig. 5 so that it will engage the end of arm 102 and depress the same. This means, as shown, comprises a rocker bar 103 (see particularly Figs. 1a, 2 and 3a), that is pivoted at 104 to a stud 105 secured to the main frame A. This rocker bar 103 at its free end is provided with an obliquely set roller 106 which, when raised, will engage the selected roller 41 and move the same toward the left in respect to Fig. 5 and into position for operation on the arm 102. The numeral 107 indicates a bracket for guiding the rocker bar 103 against lateral movements. Intermediately pivoted to the rocker bar 103 is a spring-pressed latch dog 108, the beveled depending end of which is attached to a bracket 109 secured on the main frame A. Spring 110 connected to a rocker bar and to the bracket 109 yieldingly holds the former in a depressed and inoperative position.

For sliding the free end of the rocker bar 103, when released by the latch 108, there is provided a lever 111 which, as shown, is intermediately pivoted at 112 to a bracket on one of the rails 32. At its depending end is a projecting pin 113 that underlies a flange of the rocker bar so that oscillatory movements of the lever 111 will tend to raise the rocker bar and roller 106, and will do so whenever force is applied to said lever 111 while latch 108 is released. It is now important to note that the projecting ends of the studs 40 on which the rollers 41 are mounted will on their movement with the upper portions of the carrier belts 25 engage the upper end of latch lever 108 and release the same from latch bracket 109. This release of the latch 108, however, does not accomplish anything unless the rocker bar 103, at the time of releasing the latch, is raised by movement of the lever 111, all as will more clearly appear in the description of the operation.

The manner in which the tripping rollers 41 are shifted from their outer toward their inner or operative positions has been described. The above shifting movements of the rollers take place while they are moving with the upper run of the feed belt or endless conveyor, but the return of the said rollers to their outer positions will be accomplished while the said rollers are moving with the lower or returning runs of the belts. This return movement is accomplished in a very simple way, simply by an oblique spring arm 114, one end of which is secured to a bracket 115 on the main frame (see Figs. 1a and 3a). The free end of the spring arm 114 is positioned to engage and press the rollers 41 outward, as above stated.

In the particular machine illustrated, the power for driving the various parts of the machine is transmitted through three belts, to wit: the belt 74, already noted, and power-driven belts 116 and 117 (see particularly Figs. 1, 2a and 4). The belt 116 is what may be termed the main driving belt. This belt runs over a pulley 118 on a transverse shaft 119 journaled in suitable bearings 120 on the main frame A and provided at the opposite side of the machine with a spur pinion 121. This pinion 121 meshes with a large beveled gear 122 on the shaft 23, which shaft, it will be remembered, carried the rear end belt-driving sprocket wheels 24.

The belt 117 runs over a pulley 123 mounted on a shaft 124 (see particularly Fig. 1) that is mounted in suitable bearings on the main frame and provided with a sprocket wheel 125. A sprocket chain 126 runs over the sprocket 125 and over the sprocket 64. This sprocket 64, it will be remembered, is carried by a sleeve 63 which carries the large drill-driving spur gear 62 and is rotatively journaled on the anchored sleeve 69 (again note particularly Figs. 1, 4 and 13). The sprocket 87, which is normally loose on the shaft 84 and is driven from the one-revolution clutch mechanism previously described, is driven from a sprocket chain 127 that runs under said sprocket 87 in contact therewith. This sprocket chain 127 (see particularly Figs. 1, 1a, and 2), runs over sprockets 128 and 129. The sprocket 129 is an idle sprocket journaled to a suitable bearing on the main frame. The sprocket 128 is secured to an intermediate transverse shaft 130 mounted in suitable bearings on the main frame, which shaft carries a similar sprocket 131 (see particularly Fig. 1a). A sprocket chain 132 runs over the sprocket 131 and over a large sprocket 133 (see particularly Fig. 2), that happens to be the same size as the adjacent sprocket 24. By the driving connections just described, the sprocket 87 is continuously driven in a clockwise direction in respect to Fig. 1.

Attention is now called to the fact that even when the grapples are closed on an ear of corn there will be sufficient space between the edges of the jaws 26 and 27 (note particularly Fig. 6), to expose to view a bad spot or row of kernels in an ear of corn. At this point, it may be also stated that the ears will by an operator be placed in the grapples while they are open, (as best shown at the right in Fig. 1a) and the operator in thus positioning the ear, if the ear has a bad spot, will place it in the grapple so that its bad spot will be exposed and can readily be cut out by the operator by the use of such a common tool as a portable power-driven saw, chiselled knife or the like.

*Summary of operation*

Briefly summarized the operation of the complete machine already described is substantially as follows:

The operator standing at the right hand end of the machine, as viewed in Figs. 1 and 1a, or at the left hand end, as viewed in Figs. 2 and 2a, places the ears of corn in the open grapples with the butt ends thereof against the stop plate 46. As the jaw-actuating levers 34 engage the inclined end 38a of rail 38, the jaws will be closed and caused to grip the ears of corn under tension of the springs 36. In this way the ears of corn will be gripped firmly enough to hold them in position in the grapples as the butt ends pass the primary saw 67, causing the latter to cut off the butt ends of the ears.

If any particular ear of corn has a bad row or spot, it will, as before stated, be placed in the grapples with the bad spot exposed between the edges of the jaws so that it may be cut out or trimmed. Under the ordinary action the secondary knife or cutter disc 68 will remain raised and inoperative.

As the rollers 31 run off from the guide rails 32 the jaw-actuating levers 34 will run off from the rail 38, and approximately simultaneously therewith, the chains 25 run onto the jaw sprocket 24 and the ends of levers 34 are transferred onto the lugs or rest bars 42, which latter are carried by the sprockets 24. In this way the grapple jaws are kept closed on the ears of corn while they are moving from the upper to the lower portions of the sprockets 24; and it is during this movement that the boring of the ears of corn is accomplished. Directing attention again to Fig. 4 and remembering the statements made as to the operation, attention is called to the fact that the drills 49, while under constant rotation on their own axis, will be projected to the left in respect to Fig. 4 and axially through the aligned ears of corn during the first 90° of movement of the drill-carrying frame 47, and will be retracted during the second 90° of movement of said drill carrier, from the top toward the bottom of the latter. Of course, it will be understood that the drill carrier rotates in unison with the sprockets 24 so that the drilling out of the ears of corn is accomplished by continuing action that is uninterrupted during the operation of the machine.

After the ears have been drilled they will be carried with the grapples by the lower or returning runs of the feed chains 25, under which return movement after the grapples leave the sprockets 24, the grapples will remain gravity-closed until their jaws 27 are engaged by the spring arm 65 (see Fig. 1) at which point the grapples will be positively opened and the drilled ears of corn dropped from the machine.

In the above summary of operation it has been assumed that there is no desire or necessity for cutting off the tip ends of the ears, but if this cutting were desired, it may be accomplished as follows: If the operator in placing an ear of corn in the grapple observes that its tip end should be cut off, he moves the lever 111 so as to press upward on the rocker bar 103, but this rocker bar at such time cannot be raised because its latch 108 is engaged with detent bracket 109. However, each time that a roller supporting stud 40 passes the upper end of latch 108, it disengages the same from detent 109; but the rocker 103 being yieldingly held downward by spring 110, will not move upward unless at that time pressure is exerted on lever 111 to move said rocker bar upward while its latch is released. When this conjoint tripping action takes place, the rocker will move upward carrying its oblique roller 106 into the path of movement of the next following roller 41, thereby causing the engagement of roller 41 to move inward or toward the left in respect to Fig. 5. When the roller 41 is thus shifted, it will, when it reaches the tripping arm 102, depress the latter at a proper time to cause the secondary saw to descend into a position to cut off the tip end of the particular corn ear just deposited, as stated.

The manner in which the depression of tripping arm 102 operates through the one-revolution clutch mechanism has already been clearly described; and hence, it is thought sufficient at this point to state that the one-revolution of the clutch sleeve 88 will impart one revolution to a shaft 84 and an eccentric 83, thereby causing lever 76 to move downward into operative position to perform its cutting action and then to return back to its normal position, as shown in Fig. 1.

If at any time it is desired to secure the secondary knife or cutter 68 in a depressed and operative position, that can readily be accomplished by throwing the one-revolution clutch out of action and positioning eccentric 83 into position to hold the arm 76 and cutter 68 in depressed positions. Of course, if arm 111 should be put under yielding strain tending to raise rocker bar 103, then the secondary cutter 68 would be brought down to operative position each time an ear of corn passes the same.

In the drawings I have illustrated and have above described quite specifically the commercial form of my improved machine, but it will be understood that the invention is capable of various modifications, all within the scope of the invention herein disclosed and broadly claimed.

What I claim is:

1. In a machine of the kind described, a conveyor equipped with corn ear carriers, trimming means in the path of movement of one of the ends of the corn ears in the carriers for cutting off said ends as they are successively fed thereto by the conveyor, and a second trimming means mounted for body movement and normally out of the path of movement of the other ends of the corn ears, and means operable, at will, to position the second trimming means in the path of movement of a selected corn ear to cut off the respective end thereof and thereafter return said second trimming means out of said path of movement.

2. In a machine of the kind described, a conveyor equipped with corn ear carriers, a trimming cutter at one side of the conveyor to which corn ears in the carriers are successively carried by the conveyor to trim one of their ends, a second trimming cutter mounted on the opposite side of the conveyor from the first noted trimming cutter for bodily movement and normally out of the path of movement of the corn ears, and means operable, at will, to position the second trimming cutter in the path of movement of a selected corn ear to cut off the respective end thereof and thereafter return said trimming means out of said path of movement.

3. The structure defined in claim 2 in which the movement of the second trimming cutter into and out of the path of movement of a selected corn ear is automatic.

4. In a machine of the kind described, a conveyor equipped with corn ear carriers, a trimming cutter at one side of the conveyor to which corn ears in the carriers are successively carried by the conveyor to trim one of their ends, a second trimming cutter on the opposite side of the conveyor from the first noted trimming cutter for trimming the other ends of the corn ears, said second cutter being normally out of the path of movement of the corn ears, and automatic means manually set in action, at will, to move the second trimming cutter into the path of movement of a selected corn ear to cut off the respective end thereof and thereafter return said second trimming cutter out of said path of movement before the next following corn ear is carried to the second trimming cutter.

5. In a machine of the kind described, a conveyor equipped with corn ear carriers, a trimming cutter at one side of the conveyor to which corn ears in the carriers are successively carried by the conveyor to trim one of their ends, a second trimming cutter on the opposite side of the conveyor from the first noted trimming cutter for trimming the other ends of the corn ears, said second cutter being normally out of the path of movement of the corn ears, automatic means for positioning the second trimming cutter to trim the respective end of a selected corn ear, a normally inoperative trip member on the conveyor for each corn ear carrier for setting said automatic means in action, and manually controlled means for setting a selected trip member in an operative position.

6. In a machine of the kind described, a conveyor equipped with corn ear carriers, a trimming cutter at one side of the conveyor to which corn ears in the carriers are successively carried by the conveyor to trim one of their ends, a second trimming cutter on the opposite side of the conveyor from the first noted trimming cutter for trimming the other ends of the corn ears, said second cutter being normally out of the path of movement of the corn ears, automatic means for positioning the second trimming cutter to trim the respective end of a selected corn ear, a normally inoperative trip member on the conveyor for each corn ear carrier for setting said automatic means in action, manually controlled means for setting a selected trip member in an operative position, and automatic means for returning a trip member from an operative position to an inoperative position after each trimming operation of the second trimming cutter.

7. The structure defined in claim 5 in which the automatic means includes a pivoted arm carrying the second trimming cutter, an eccentric having a connection to said arm, and a one-revolution clutch arranged to be set in action by a selected trip member.

8. The structure defined in claim 5 in which each trip member includes an axially movable roller.

9. The structure defined in claim 5 in which each trip member includes an axially movable roller and in which the manually controlled means for setting a selected trip member in an operative position is a cam-acting roller, arranged, when in an operative position, to move a trip roller, engaging the same axially.

10. In a machine of the kind described, the combination with an endless conveyor belt and guiding and driving means including a pair of radially spaced wheels over which said belt is arranged to run and causing the upper and lower runs thereof to travel approximately horizontal courses, of corn-ear-engaging grapples carried by said belt and arranged to hold the corn ears transversely of said belt with their end portions extending outwardly thereof, means for closing the grapples as they start their movement on the upper run of said belt, a trimming cutter on one side of the upper run of said belt between said two wheels for trimming the respective ends of the corn ears, a driven rotary drill carrier on the same side of said belt as the trimming cutter and mounted to turn about the axis of the shaft of the wheel, at the opposite end of said belt from which the grapples start their movement on the upper run thereof, a plurality of circumferentially spaced drills mounted on the drill carrier for boring out the cores of the corn ears in the grapples moving about the axis of the respective wheel, means for rotating and reciprocating the drills, and a stop member on the opposite side of the conveyor belt from the drill carrier for holding the corn ears against endwise movement while they are being cored by the drills, said stop member having an aperture in which the drills are free to move endwise and laterally relative to the stop member.

11. In a machine of the kind described, the combination with an endless conveyor belt and guiding and driving means including a pair of radially spaced wheels over which said belt is arranged to run and causing the upper and lower runs thereof to travel approximately horizontal courses, of corn-ear-engaging grapples carried by said belt and arranged to hold the corn ears transversely of said belt with their end portions extending outwardly thereof, means for closing the grapples as they start their movement on the upper run of said belt, a trimming cutter on one side of the upper run of said belt between said two wheels for trimming the respective ends of the corn ears, a driven rotary drill carrier on the same side of said belt as the trimming cutter and mounted to turn about the axis of the shaft of said wheel, at the opposite end of said belt from which the grapples start their movement on the upper run thereof, a plurality of circumferentially spaced drills mounted on the drill carrier for boring out the cores of the corn ears in the grapples moving about the axis of the respective wheel, means for rotating and reciprocating the drills, and a stop member on the same side of the conveyor belt as the drill carrier, for holding the corn ears against endwise movement while the drills are being withdrawn therefrom at the completion of the coring thereof, said stop member having an aperture in which the drills are free to move endwise and laterally relative to the stop member.

12. In a machine of the kind described, a conveyor equipped with corn ear carriers, a rotary trimming knife mounted for oscillatory movement transversely of corn ears in the carriers at one of their end portions, said knife being normally held against oscillatory movement and out of the path of movement of the corn ears, means for rotating the knife, and manually released automatic means for oscillating said knife to position the same in front of a selected corn ear to trim the respective end thereof and then moving said knife out of the path of movement of the corn ears before the next following corn ear reaches said knife and thus remain in an inoperative position until said automatic means is again released to trim a selected corn ear.

FRANK W. DOUTHITT.